(12) United States Patent
Lundblad

(10) Patent No.: US 7,409,102 B2
(45) Date of Patent: Aug. 5, 2008

(54) METHODS AND SYSTEMS FOR REDUCING RINGING IN COMPOSITED USER INTERFACE ELEMENTS

(75) Inventor: James A Lundblad, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 665 days.

(21) Appl. No.: 11/087,259

(22) Filed: Mar. 23, 2005

(65) Prior Publication Data
US 2006/0214941 A1 Sep. 28, 2006

(51) Int. Cl.
G06K 9/40 (2006.01)
G09G 5/02 (2006.01)

(52) U.S. Cl. .................. 382/260; 382/266; 345/589
(58) Field of Classification Search .......... 382/260; 345/589
See application file for complete search history.

(56) References Cited

U.S. PATENT DOCUMENTS

| | | | |
|---|---|---|---|
| 5,914,725 A | * | 6/1999 | MacInnis et al. ........ 345/441 |
| 6,128,000 A | * | 10/2000 | Jouppi et al. ........ 345/614 |
| 6,360,023 B1 | * | 3/2002 | Betrisey et al. ........ 382/260 |
| 6,738,526 B1 | * | 5/2004 | Betrisey et al. ........ 382/260 |
| 7,130,480 B2 | * | 10/2006 | Betrisey et al. ........ 382/260 |

* cited by examiner

*Primary Examiner*—Matthew Bella
*Assistant Examiner*—Jose M Torres
(74) *Attorney, Agent, or Firm*—Lee & Hayes, PLLC

(57) ABSTRACT

Video graphics methods and systems can reduce objectionable ringing associated with composited user interface elements and video content, while at the same time preserve, to a desirable degree, the fidelity of the video content. In at least some embodiments, after the user interface elements are created, they are pre-filtered, before compositing, in a particular way that is designed to reduce undesirable ringing. Further, in at least some embodiments, during the compositing process, the left and right edges of the user interface elements are treated in a manner that is designed to reduce the ringing that would otherwise be induced by the left and right edges respectively.

17 Claims, 6 Drawing Sheets

METHODS AND SYSTEMS FOR REDUCING RINGING IN COMPOSITED USER INTERFACE ELEMENTS

TECHNICAL FIELD

This invention pertains to video graphics methods and systems.

BACKGROUND

Many video graphics systems utilize user interface elements that enable a user to interface, in some way, with the video graphics and/or the application or system that renders the graphics. User interface elements can come in many types, geometries and sizes, such as boxes, buttons, sliders, knobs and the like which enable a user to provide input into the system. Alternately or additionally, user interface elements can be used to simply convey information to a user.

Regardless of the nature of the user interface elements, when a user interface is constructed by compositing video content and the user interface elements, as by layering one on top of the other, visually-perceptible problems can arise when the composition is ultimately rendered on a display, such as a television, for a user.

As an example, consider the following. User interface elements can contain sharp transitions or edges which, when passed through certain interpolators during compositing, such as up-samplers and follow-on filters as one might find in television encoding devices, can produce objectionable ringing on a television monitor. Ringing can manifest itself as fringing (in close up view) or as lack of sharpness (at a distance).

Accordingly, this invention arose out of concerns associated with providing systems and methods that can reduce this objectionable ringing while, at the same time preserve to a desirable degree the fidelity of the video content.

SUMMARY

Video graphics methods and systems are described which, in at least some embodiments, can reduce objectionable ringing associated with composited user interface elements and video content, while at the same time preserve, to a desirable degree, the fidelity of the video content.

In one embodiment, after the user interface elements are created, they are pre-filtered, before compositing, in a particular way that is designed to reduce undesirable ringing. Further, in at least some embodiments, during the compositing process, the left and right edges of the user interface elements are treated in a manner that is designed to reduce the ringing that would otherwise be induced by the left and right edges.

DETAILED DESCRIPTION

Overview

Figure 1:
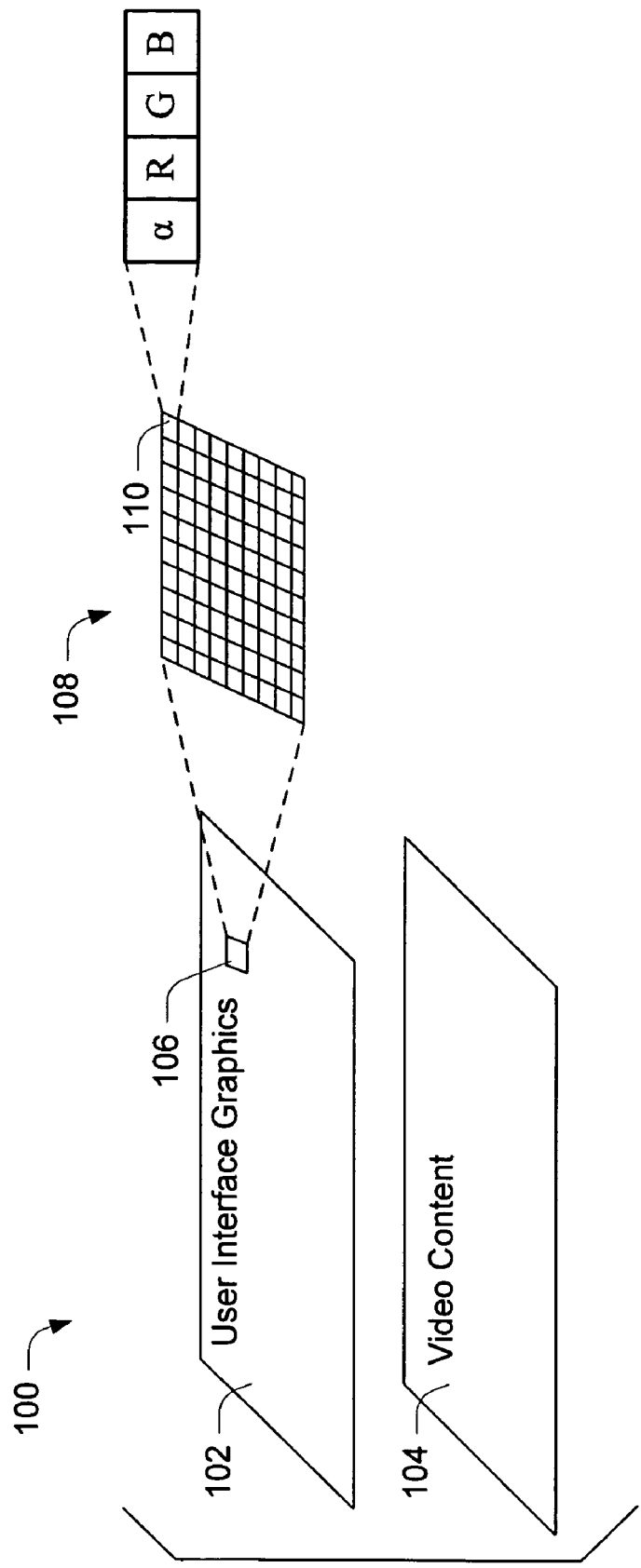
FIG. 1 illustrates a user interface graphics layer and a video content layer that can be processed in accordance with one or more embodiments.

Video graphics methods and systems are described which, in at least some embodiments, can reduce objectionable ringing associated with composited user interface elements and video content, while at the same time preserve, to a desirable degree, the fidelity of the video content.

In one embodiment, after the user interface elements are created, they are pre-filtered, before compositing, in a particular way that is designed to reduce undesirable ringing. In one exemplary embodiment, pre-filtering takes place on a pixel-by-pixel basis and, is a function of a particular pixel's alpha transparency.

Further, in at least some embodiments, during the compositing process, the left and right edges of the user interface elements are treated in a manner that is designed to reduce the ringing that would otherwise be induced by the left and right edges respectively. In one exemplary embodiment, the left and right edges of the user interface elements are treated to add extensions to each, with each pixel of an extension having an alpha transparency value that is calculated to reduce edge ringing. In one embodiment, each extension is a pixel-wide extension.

Preliminarily, before discussing the various embodiments and to provide some context for the discussion below, consider FIG. 1 which illustrates, generally at 100, a user interface graphics layer 102 and a video content layer 104 prior to compositing. In this example, user interface graphics layer 102 includes a single user interface element 106 which, in turn, is made up of a collection of pixels depicted generally at 108. The collection of pixels comprises individual pixels, an exemplary one of which is designated at 110. Each pixel, in turn, comprises an alpha channel (depicted by the a field) which defines the pixel's transparency, and color channels that define each pixel's color. In the present example, each pixel has a red, green and blue color channel, depicted respectively by the "R", "G" and "B" fields. In addition to the alpha and color channels, each pixel can comprise other data which define characteristics, such as the pixel's luminance and the like. For purposes of simplicity, though, only the alpha and color channels are presently discussed.

The alpha channel typically contains as many bits as a color channel. So, for example, in scenarios in which each color channel consists of 8 bits, an 8-bit alpha channel can represent 256 levels of transparency, from 0 (in which the entire pixel is transparent) to 255 (in which the entire pixel is opaque).

As will be appreciated by the skilled artisan, when layers 102 and 104 are eventually composited, the layers will be combined to form a new image in which layer 102 is placed over layer 104 in a manner that takes into account the alpha information of both images.

Reducing Ringing Effects by Pre-Filtering User Interface Elements

As noted above, in accordance with one embodiment, ringing effects can be reduced by pre-filtering user interface elements after the elements are created, but before the elements are composited with video content. In the illustrated and described embodiment, pre-filtering takes place on a pixel-by-pixel basis and is a function of a particular pixel's alpha transparency.

Figure 2:
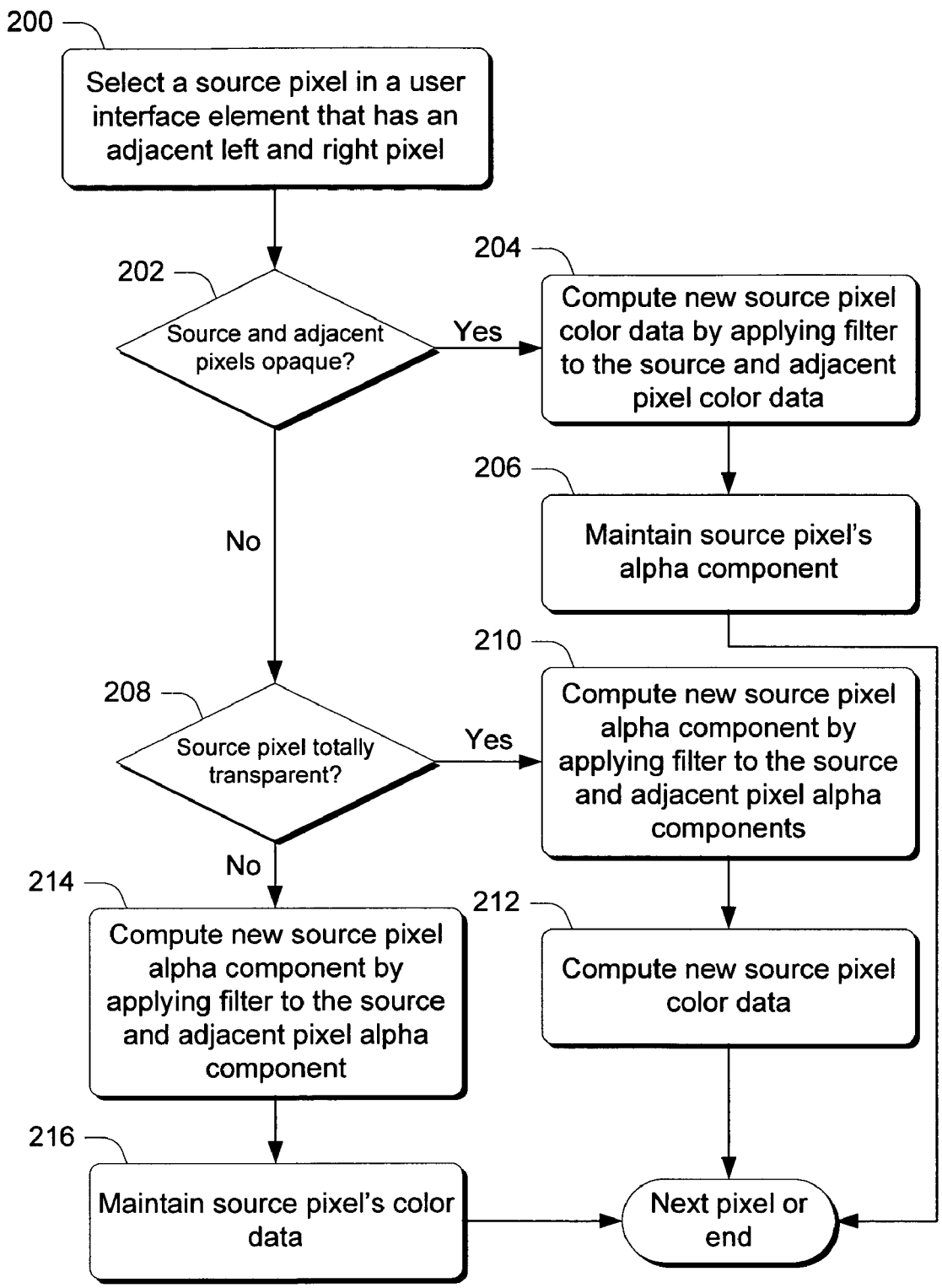
FIG. 2 is a flow diagram that describes steps in a method in accordance with one embodiment.

As an example, consider FIG. 2 which is a flow diagram that describes a method in accordance with one embodiment. The method can be implemented in connection with any suitable hardware, software, firmware or combination thereof. In one embodiment, the method can be implemented in connection with a system, such as the one shown and described below under the heading "Exemplary Implementation Environment". It is to be appreciated and understood, however, that the described implementation environment constitutes but one example of an environment in which the inventive principles can be practiced. Accordingly, the inventive principles can be employed in other environments without departing from the spirit and scope of the claimed subject matter.

Step 200 selects a source pixel in a user interface element that has an adjacent left and right pixel. Step 202 then ascertains whether the source and adjacent pixels are opaque. In one embodiment, this step can be performed by taking the bitwise AND of the pixels' alpha channel data. In an embodiment in which the alpha channel comprises an 8-bit value, if the bitwise AND is equal to 255, then this condition is met. Accordingly, if the source and adjacent pixels are opaque, step 204 computes new source pixel color data by applying a filter to the source and adjacent pixel color data. In the illustrated and described embodiment, this operation can be mathematically represented as follows:

$$R'[N]=\text{Filter}(R[N-1],R[N],R[N+1])$$

$$G'[N]=\text{Filter}(G[N-1],G[N],G[N+1])$$

$$B'[N]=\text{Filter}(B[N-1],B[N],B[N+1]),$$

where the source pixel is represented by N, the source pixel's left and right adjacent pixels are represented by [N−1] and [N+1] respectively, and R'[N], G'[N] and B'[N] represent the new source pixel's red, green and blue color data respectively. In the illustrated and described embodiment, a filter kernel used for the filter function is (0.15, 0.7, 0.15) and is based on a specific simulation that desirably reduced the ringing, but did not overly "soften" the graphics. It is to be appreciated and understood that other filter kernels can be utilized without departing from the spirit and scope of the claimed subject matter.

Continuing, in the event that the condition of step 202 is met, step 206 maintains the source pixel's alpha component. In an embodiment in which the alpha channel comprises an 8-bit value, this can be mathematically represented as follows:

$$\text{Alpha'}[N]=255.$$

The method then branches to process the next pixel with adjacent left and right pixels, or the method ends.

In an event that the source and adjacent pixels are not opaque, then step 208 ascertains whether the source pixel is totally transparent. In an embodiment in which the alpha channel comprises an 8-bit value, this condition is met if the alpha channel's 8-bit value is equal to 0. Accordingly, if this condition is met, step 210 computes a new source pixel alpha component by applying a filter to the source and adjacent pixel alpha components. In one embodiment, the same filter that was used at step 204 is used in executing this step. Accordingly, this operation can be mathematically represented as follows:

$$\text{Alpha'}[N]=\text{Filter}(\text{Alpha}[N-1],\text{Alpha}[N],\text{Alpha}[N+1]).$$

Continuing, in the event that the condition of step 208 is met, step 212 computes new source pixel color data. In accordance with one embodiment, the new source pixel color data is computed as the maximum of the color values of the adjacent left, adjacent right and source pixels. This operation can be mathematically represented as follows:

$$R'[N]=\text{Max}(R[N-1],R[N],R[N+1])$$

$$G'[N]=\text{Max}(G[N-1],G[N],G[N+1])$$

$$B'[N]=\text{Max}(B[N-1],B[N],B[N+1]).$$

In another embodiment, step 212 can be executed by selecting, for the source pixel's color values, the colors values associated with the adjacent pixel having the largest luminance.

The method then branches to process the next pixel with adjacent left and right pixels, or the method ends.

In an event that the source pixel is not totally transparent (which indicates at this point that the source pixel is partially transparent), then step 214 computes a new source pixel alpha component by applying a filter to the source and adjacent pixel alpha components. In one embodiment, the same filter that was used at steps 204 and 210 is used. Accordingly, this operation can be mathematically represented as follows:

$$\text{Alpha'}[N]=\text{Filter}(\text{Alpha}[N-1],\text{Alpha}[N],\text{Alpha}[N+1]).$$

Continuing, step 216 maintains the source pixel's color data. This operation can be mathematically represented as follows:

$$R'[N]=R[N]$$

$$G'[N]=G[N]$$

$$B'[N]=B[N].$$

The method then branches to process the next pixel with adjacent left and right pixels, or the method ends.

In accordance with one embodiment, the operations described above are performed once, after the user interface elements are created, but before they are composited with video content.

In addition, it is to be appreciated and understood that an extension of the above-described processing can enable the filter on a per pixel basis, based on the presence of a sharp edge at a particular pixel position.

Reducing Edge Ringing Effects

In accordance with one embodiment, a user interface element, such as one that has been processed as described above, can be further processed to reduce the ringing that would otherwise be induced by the element's left and right edges. In one embodiment, this processing can take place during the compositing process.

Figure 3:
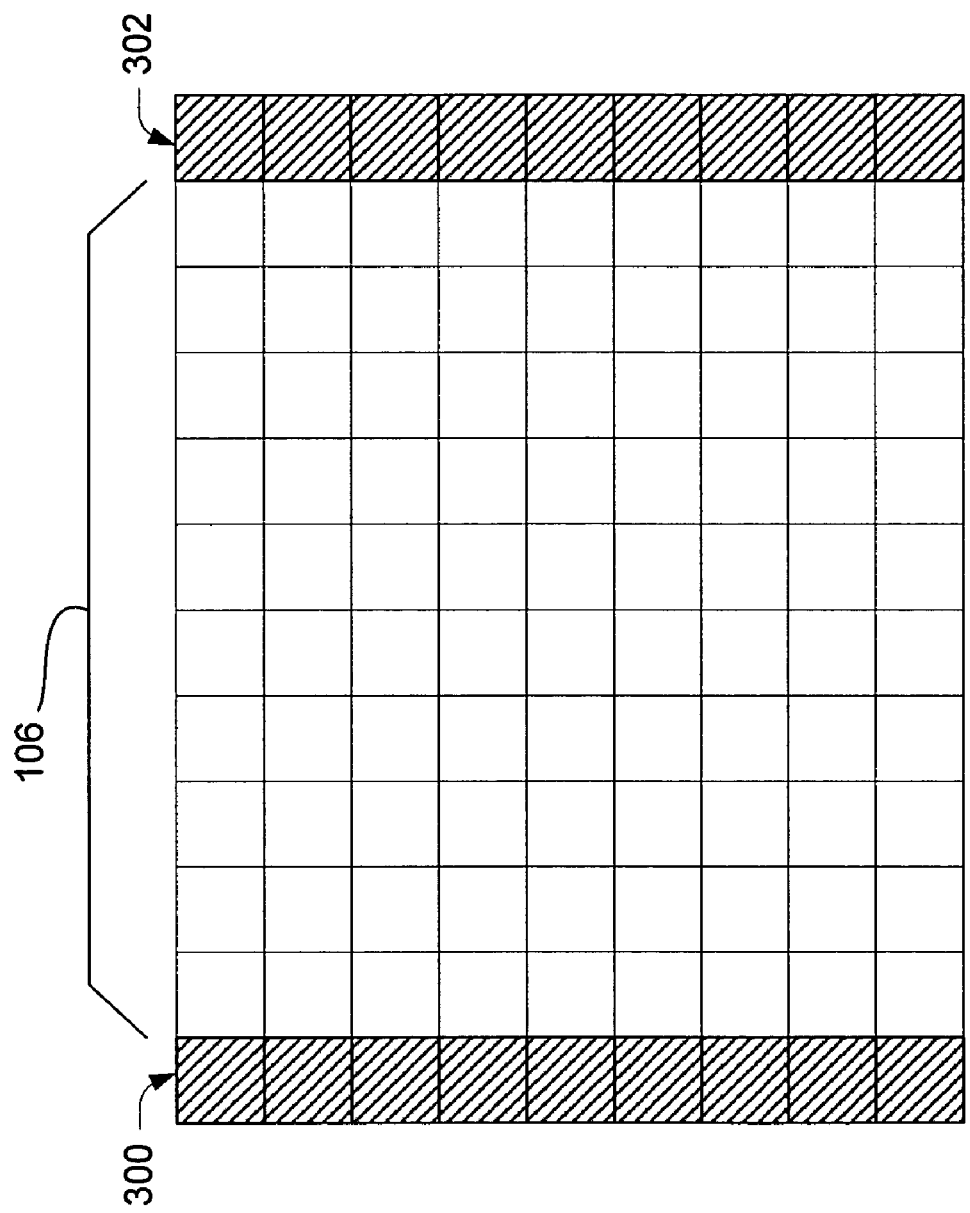
FIG. 3 illustrates a user interface element in accordance with one embodiment.

As an example, consider FIG. 3, which illustrates user interface element 106 from FIG. 1. Here, in accordance with one embodiment, extensions 300, 302 are added, respectively, to each of the left and right edges of the user interface element. In the illustrated and described embodiment, each extension is a pixel-wide, and the individual pixels of each extension have alpha components that are a function of the horizontally adjacent pixel, and color values that are the same as the horizontally adjacent pixel. Extensions of other dimensions can, however, be utilized without departing from the spirit and scope of the claimed subject matter.

In this particular example, the alpha components that are utilized for pixels of the extension have values that are reduced by a ratio of the filter coefficients that were utilized in the filtering operations described above. In this example, the ratio is computed as the first filter coefficient divided by the sum of the second and third filter coefficients. This operation can be mathematically represented as follows:

Alpha'[New]=0.15*Alpha[Edge]/0.85, where Alpha'[New] is the alpha value of the added pixel, and Alpha[Edge] is the alpha value of the new pixel's horizontal neighbor.

In this embodiment, the addition of the pixel extensions and their corresponding alpha and color values produces a transition that is similar to having filtered the user interface element using the filter that was used above, i.e. the filter having the kernel (0.15, 0.7, 0.15).

Figure 4:
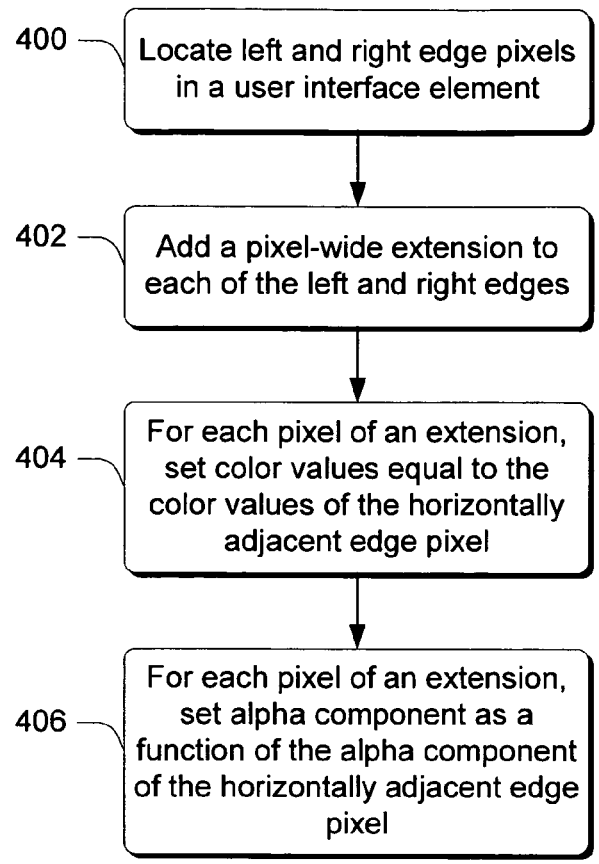
FIG. 4 is a flow diagram that describes steps in a method in accordance with one embodiment.

FIG. 4 is a flow diagram that describes a method in accordance with one embodiment. The method can be implemented in connection with any suitable hardware, software, firmware or combination thereof. In one embodiment, the method can be implemented in connection with a system, such as the one shown and described below under the heading "Exemplary Implementation Environment". It is to be appreciated and understood, however, that the described implementation environment constitutes but one example of an environment in which the inventive principles can be practiced. Accordingly, the inventive principles can be employed in other environments without departing from the spirit and scope of the claimed subject matter.

In at least some embodiments, the method can be implemented in connection with the method described under the heading "Reducing Edge Ringing Effects" above.

Step 400 locates left and right edge pixels in a user interface element. An exemplary user interface element is shown and described in FIG. 3. Step 402 adds a pixel-wide extension to each of the left and right edges. Exemplary pixel-wide extensions are shown in FIG. 3 at 300, 302 respectively. For each pixel of an extension, step 404 sets color values equal to the color values of the horizontally adjacent edge pixel. In addition, for each pixel of an extension, step 406 sets its alpha component as a function of the alpha component of the horizontally adjacent edge pixel. Examples of how this can be done are given above.

In one embodiment, the method just described takes place during compositing of the user interface element with video content. There are many different ways that compositing can take place. For example, compositing can take place in a graphics frame buffer in ways that will be appreciated by the skilled artisan. Alternately, compositing can take place by using video overlay hardware between the graphics frame buffer and a television encoder, as will be appreciated by the skilled artisan. As compositing techniques are well known, for the sake of brevity, such techniques are not described here in additional detail.

Exemplary Implementation Environment

The above-described techniques can be employed in any suitable environment. But one exemplary environment is described just below.

Figure 5:
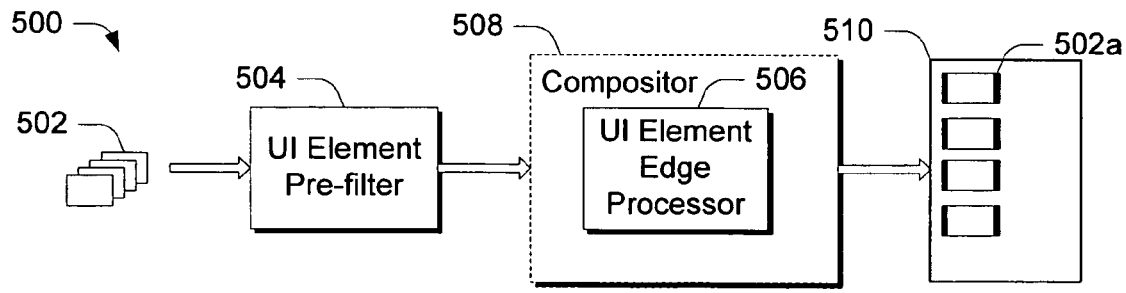
FIG. 5 illustrates an exemplary system comprising a user interface pre-filter and edge processor, in accordance with one embodiment.

Consider first FIG. 5 which shows a system, generally at 500, in accordance with one embodiment. In this example, the user interface elements are both pre-filtered and edge-processed. Specifically, a collection of user interface elements 502 is received by a user interface element pre-filter 504 and the individual user interface elements are processed as described above. In at least one embodiment, the user interface pre-filter is implemented in software.

Further, in accordance with this embodiment, the pre-filtered user interface elements are then provided to a user interface edge processor 506 for processing as described above. In at least one embodiment, edge processing can take place during compositing. Accordingly, edge processor 506 is logically depicted as part of a compositor 508.

Once processed by the pre-filter 504 and edge processor 506, the processed user interface elements 502a can comprise part of a composited image 510 which, in turn, can be provided to an encoder, such as a television encoder and then subsequently provided to one or more content providers for distribution.

Figure 6:
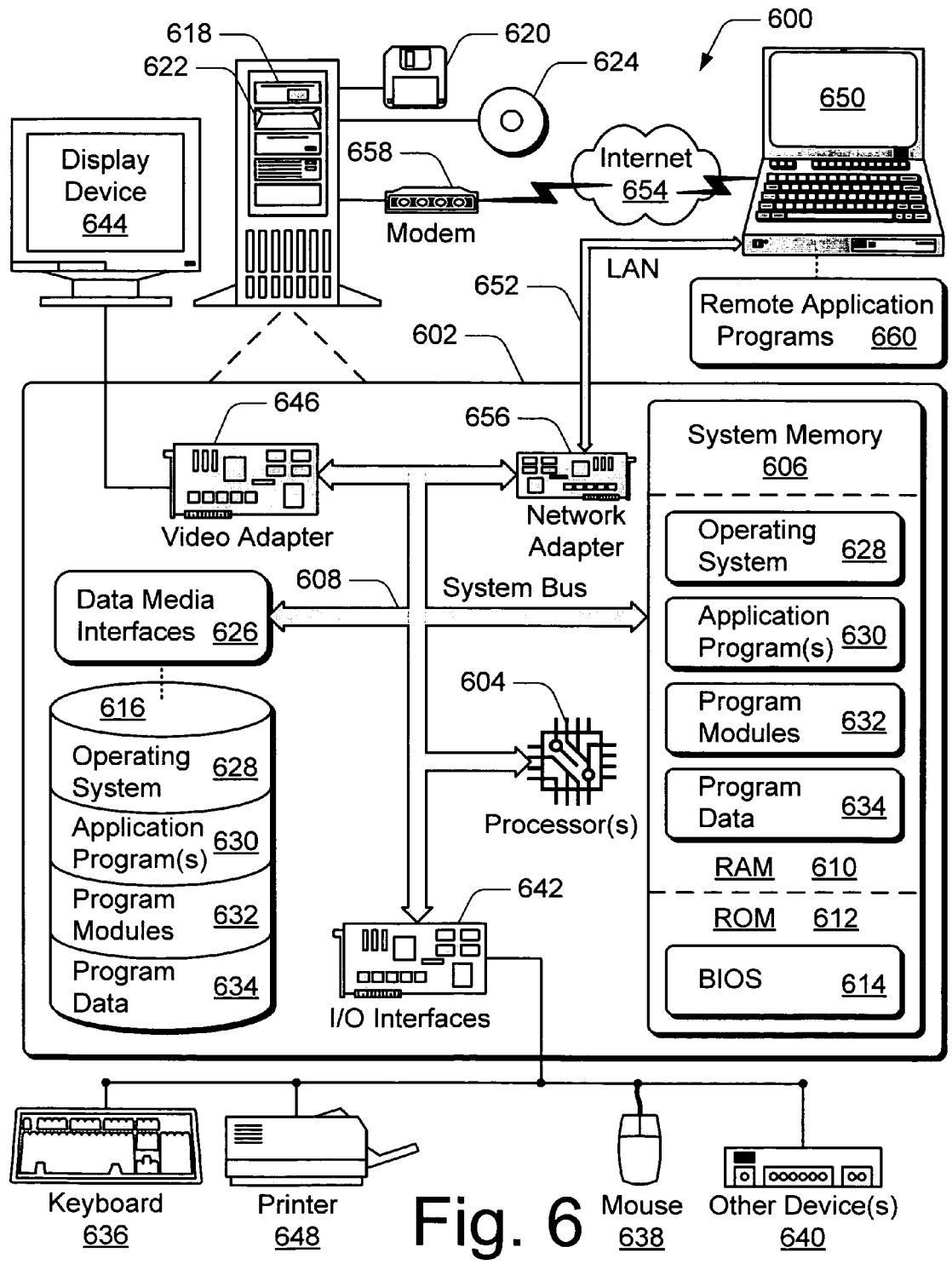
FIG. 6 illustrates an exemplary computing system that can be used to implement the FIG. 5 system, in accordance with one embodiment.

FIG. 6 illustrates an exemplary computing system that can be utilized to implement the FIG. 5 system, as well as other embodiments which practice the inventive principles, in accordance with one embodiment.

Exemplary computing environment 600 is only one example of a computing system and is not intended to suggest any limitation as to the scope of use or functionality of the architectures. Neither should the computing environment 600 be interpreted as having any dependency or requirement relating to any one or combination of components illustrated in the exemplary computing environment 600.

The computer and network architectures in computing environment 600 can be implemented with numerous other general purpose or special purpose computing system environments or configurations. Examples of well known computing systems, environments, and/or configurations that may be suitable for use include, but are not limited to, personal computers, server computers, client devices, hand-held or laptop devices, microprocessor-based systems, multiprocessor systems, set top boxes, programmable consumer electronics, network PCs, minicomputers, mainframe computers, gaming consoles, distributed computing environments that include any of the above systems or devices, and the like.

The computing environment 600 includes a general-purpose computing system in the form of a computing device 602. The components of computing device 602 can include, but are not limited to, one or more processors 604 (e.g., any of microprocessors, controllers, and the like), a system memory 606, and a system bus 608 that couples the various system components. The one or more processors 604 process various computer executable instructions to control the operation of computing device 602 and to communicate with other electronic and computing devices. The system bus 608 represents any number of several types of bus structures, including a memory bus or memory controller, a peripheral bus, an accelerated graphics port, and a processor or local bus using any of a variety of bus architectures.

Computing environment 600 includes a variety of computer readable media which can be any media that is accessible by computing device 602 and includes both volatile and non-volatile media, removable and non-removable media. The system memory 606 includes computer readable media in the form of volatile memory, such as random access memory (RAM) 610, and/or non-volatile memory, such as read only memory (ROM) 612. A basic input/output system (BIOS) 614 maintains the basic routines that facilitate information transfer between components within computing device 602, such as during start-up, and is stored in ROM 612. RAM 610 typically contains data and/or program modules that are immediately accessible to and/or presently operated on by one or more of the processors 604.

Computing device 602 may include other removable/non-removable, volatile/non-volatile computer storage media. By way of example, a hard disk drive 616 reads from and writes to a non-removable, non-volatile magnetic media (not shown), a magnetic disk drive 618 reads from and writes to a removable, non-volatile magnetic disk 620 (e.g., a "floppy disk"), and an optical disk drive 622 reads from and/or writes to a removable, non-volatile optical disk 624 such as a CD-ROM, digital versatile disk (DVD), or any other type of optical media. In this example, the hard disk drive 616, magnetic disk drive 618, and optical disk drive 622 are each connected to the system bus 608 by one or more data media interfaces 626. The disk drives and associated computer readable media provide non-volatile storage of computer readable instructions, data structures, program modules, and other data for computing device 602.

Any number of program modules can be stored on RAM 610, ROM 612, hard disk 616, magnetic disk 620, and/or optical disk 624, including by way of example, an operating system 628, one or more application programs 630 (which can include user interface element pre-filter 504 and edge processor 506 (FIG. 5)), other program modules 632, and program data 634. Each of such operating system 628, application program(s) 630, other program modules 632, program data 634, or any combination thereof, may include one or more embodiments of the systems and methods described herein.

Computing device 602 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example and not limitation, communication media includes wired media such as a wired network or direct-wired connection, and wireless media such as acoustic, RF, infrared, other wireless media, and/or any combination thereof.

A user can interface with computing device 602 via any number of different input devices such as a keyboard 636 and pointing device 638 (e.g., a "mouse"). Other input devices 640 (not shown specifically) may include a microphone, joystick, game pad, controller, satellite dish, serial port, scanner, and/or the like. These and other input devices are connected to the processors 604 via input/output interfaces 642 that are coupled to the system bus 608, but may be connected by other interface and bus structures, such as a parallel port, game port, and/or a universal serial bus (USB).

A display device 644 (or other type of monitor) can be connected to the system bus 608 via an interface, such as a video adapter 646. In addition to the display device 644, other output peripheral devices can include components such as speakers (not shown) and a printer 648 which can be connected to computing device 602 via the input/output interfaces 642.

Computing device 602 can operate in a networked environment using logical connections to one or more remote computers, such as remote computing device 650. By way of example, remote computing device 650 can be a personal computer, portable computer, a server, a router, a network computer, a peer device or other common network node, and the like. The remote computing device 650 is illustrated as a portable computer that can include any number and combination of the different components, elements, and features described herein relative to computing device 602.

Logical connections between computing device 602 and the remote computing device 650 are depicted as a local area network (LAN) 652 and a general wide area network (WAN) 654. Such networking environments are commonplace in offices, enterprise-wide computer networks, intranets, and the Internet. When implemented in a LAN networking environment, the computing device 602 is connected to a local network 652 via a network interface or adapter 656. When implemented in a WAN networking environment, the computing device 602 typically includes a modem 658 or other means for establishing communications over the wide area network 654. The modem 658 can be internal or external to computing device 602, and can be connected to the system bus 608 via the input/output interfaces 642 or other appropriate mechanisms. The illustrated network connections are merely exemplary and other means of establishing communication link(s) between the computing devices 602 and 650 can be utilized.

In a networked environment, such as that illustrated with computing environment 600, program modules depicted relative to the computing device 602, or portions thereof, may be stored in a remote memory storage device. By way of example, remote application programs 660 are maintained with a memory device of remote computing device 650. For purposes of illustration, application programs and other executable program components, such as operating system 628, are illustrated herein as discrete blocks, although it is recognized that such programs and components reside at various times in different storage components of the computing device 602, and are executed by the one or more processors 604 of the computing device 602.

Figure 7:
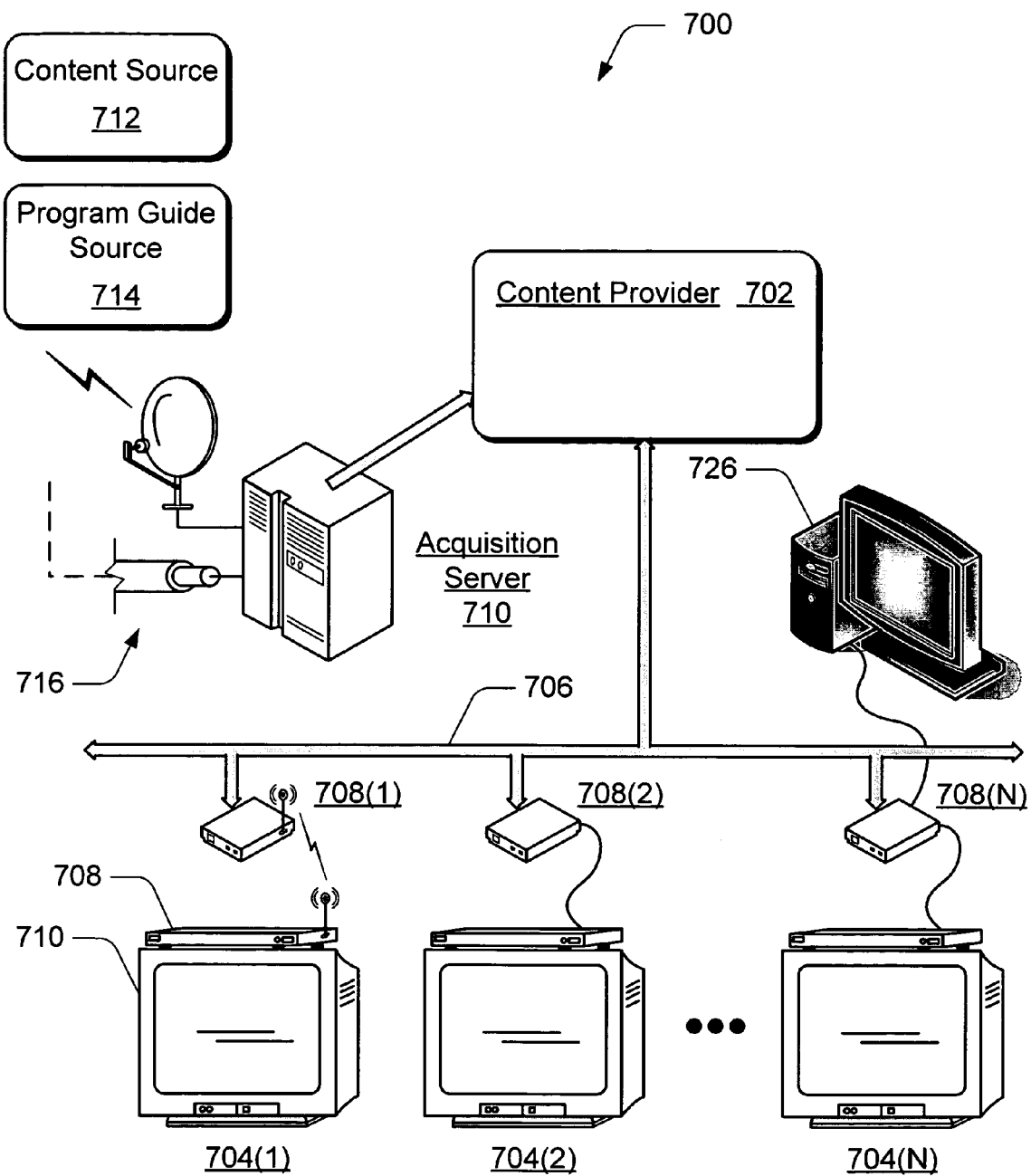
FIG. 7 illustrates various devices and components in an exemplary entertainment and information system in connection with which various embodiments can be implemented.

Having been processed as described above, composited video content embodying various user interface elements can be utilized in connection with an entertainment and information system, such as the one shown and described in FIG. 7.

There, system 700 comprises an IP-based television environment that facilitates the distribution of program content and program guide data to multiple viewers and includes a content provider 702 and television-based client systems 704 (1–N) each configured for communication via a network 706. The network 706 can be implemented as a wide area network (e.g., the Internet), an intranet, a Digital Subscriber Line (DSL) network infrastructure, or as a point-to-point coupling infrastructure. Additionally, network 706 can be implemented using any type of network topology and any network communication protocol, and can be represented or otherwise implemented as a combination of two or more networks. A digital network can include various hardwired and/or wireless links 708(1–N), routers, gateways, and so on to facilitate communication between content provider 702 and the client systems 704(1–N).

System 700 can include an acquisition server 710 that receives program content from a content source 712, and program guide data from a program guide source 714. The program guide data can be used to generate an electronic program guide. The content source 712 and the program guide source 714 control distribution of the program content and the program guide data to the acquisition server 710 via various transmission media 716, such as satellite transmission, radio frequency transmission, cable transmission, and/or via any number of other transmission media. In this example, acquisition server 710 is shown as an independent component of system 700 that communicates the program content and program guide data to content provider 702. In an alternate implementation, acquisition server 710 can be implemented as a component of content provider 702.

As used herein, "program(s)" and "program content" pertains to news shows, sitcoms, comedies, movies, commercials, talk shows, sporting events, on-demand videos, and any other form of television-based entertainment and information. Further, "recorded programs" include any of the aforementioned "programs" that have been recorded and that are maintained with a memory component as recorded programs, or that are maintained with a remote program data store. The "recorded programs" can also include any of the aforementioned "programs" that have been recorded and that are maintained at a broadcast center and/or at a headend that distributes the recorded programs to subscriber sites and to the client systems 704(1-N). These programs and program content can and typically do contain user interface elements, such as those that have been processed as described above.

Content provider 702 is representative of a headend service in a television-based content distribution system, for example, that includes server(s) to provide the program content and associated data, as well as program guide data, to multiple subscribers (e.g., the television-based client systems 704(1-N)). The content provider 702 can be implemented as a satellite operator, a network television operator, a cable operator, and the like to control distribution of program content, such as movies, television programs, commercials, music, and other audio, video, and/or image content to the client systems 704(1-N).

The television-based client systems 704(1-N) can be implemented with any number and combination of differing components. In this example, the television-based client systems 704(1-N) can be implemented to include a client device 708 and a display device 710 (e.g., a television). Additionally, a client device 708 of a television-based client system 704 can be implemented in any number of embodiments, such as a set-top box, a digital video recorder (DVR) and playback system, a personal video recorder (PVR), an appliance device, and as any other type of client device that may be implemented in a television-based entertainment and information system.

A particular client device 708 of a television-based client system 704 can be coupled to any number of televisions 710 and/or similar devices that can be implemented to display or otherwise render program content. Similarly, any number of the client devices 708 of the respective client systems 704(1-N) can be coupled to a single television 710. In an alternate embodiment, client system 704(N) is implemented with a computing device 726 as well as a client device 708.

CONCLUSION

The above described video graphics methods and systems can reduce objectionable ringing associated with composited user interface elements and video content, while at the same time preserve, to a desirable degree, the fidelity of the video content. In at least some embodiments, after the user interface elements are created, they are pre-filtered, before compositing, in a particular way that is designed to reduce undesirable ringing. Further, in at least some embodiments, during the compositing process, the left and right edges of the user interface elements are treated in a manner that is designed to reduce the ringing that would otherwise be induced by the left and right edges respectively.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
   prior to compositing a user interface element with video content, prefiltering pixels of the user interface element by:
   selecting a source pixel in a user interface element that has an adjacent left and right pixel;
   ascertaining whether the source and adjacent pixels are opaque and, if so, computing new source pixel color data by applying a filter to color data associated with the source and adjacent pixels; and
   in an event that the source and adjacent pixels are not opaque, computing a new source pixel alpha component by applying the filter to the source and adjacent pixel alpha components; and
   after said pre-filtering, adding extensions to each of a left and right edge of the user interface element,
   wherein said act of adding is performed by adding pixels having alpha components, such that the alpha components are a function of a horizontally adjacent pixel and have individual values that are reduced by a ratio of filter coefficients of said filter.

2. The method of claim 1, wherein said act of adding is performed during compositing the user interface element with video content.

3. The method of claim 1, wherein said act of adding is performed by adding pixels having color values that are the same as a horizontally adjacent pixel.

4. The method of claim 1, wherein said pre-filtering further comprises, in the event that the source and adjacent pixels are opaque, maintaining the source pixel's alpha component.

5. The method of claim 1, wherein said pre-filtering further comprises, in the event the source pixel is totally transparent, computing new source pixel color data.

6. The method of claim 1, wherein said pre-filtering further comprises, in the event that the source pixel is partially transparent, maintaining the source pixel's color data.

7. A method comprising:
   selecting a source pixel in a user interface element that has an adjacent left and right pixel;
   ascertaining whether the source and adjacent pixels are opaque and, if so, computing new source pixel color data by applying a filter to color data associated with the source and adjacent pixels; and
   maintaining the source pixel's alpha component; and
   in an event that the source and adjacent pixels are not opaque, computing a new source pixel alpha component by applying a filter to the source and adjacent pixel alpha components.

8. The method of claim 7, wherein the acts of applying a filter to the color data and applying a filter to the source and adjacent pixel alpha components comprise applying the same filter.

9. The method of claim 7 further comprising, in the event the source pixel is totally transparent, computing new source pixel color data.

10. The method of claim 9, wherein the act of computing new source pixel color data if the pixel is totally transparent comprises computing said new source pixel color data as the maximum of the color values of the source and adjacent pixels.

11. The method of claim 9, wherein the act of computing new source pixel color data if the pixel is totally transparent comprises selecting color values associated with the adjacent pixel having the largest luminance.

12. The method of claim 7 further comprising in the event that the source pixel is partially transparent, maintaining the source pixel's color data.

13. The method of claim 7, wherein said acts of selecting, ascertaining and computing are performed before the user interface element is composited with video content.

14. A method comprising:
  selecting a source pixel in a user interface element that has an adjacent left and right pixel;
  ascertaining whether the source and adjacent pixels are opaque and, if so:
  computing new source pixel color data by applying a filter to color data associated with the source and adjacent pixels; and
  maintaining the source pixel's alpha component;
  in an event that the source and adjacent pixels are not opaque and the source pixel is totally transparent:
  computing a new source pixel alpha component by applying a filter to the source and adjacent pixel alpha components; and
  computing new source pixel color data;
  in an event that the source pixel is partially transparent:
  computing a new source pixel alpha component by applying a filter to the source and adjacent pixel alpha components; and
  maintaining the source pixel's color data; and
  adding pixel-wide extensions to each of a left and right edge of the user interface element.

15. The method of claim 14, wherein in the event that the source pixel is totally transparent, the act of computing new source pixel color data comprises computing said new source pixel color data as the maximum of the color values of the source and adjacent pixels.

16. The method of claim 14, wherein in the event that the source pixel is totally transparent, the act of computing new source pixel color data comprises selecting color values associated with the adjacent pixel having the largest luminance.

17. The method of claim 14, wherein said act of adding is performed by adding pixels having alpha components that are a function of a horizontally adjacent pixel, and color values that are the same as the horizontally adjacent pixel.

* * * * *